H. E. STOIK & J. E. FISH.
SILO HEATING SYSTEM.
APPLICATION FILED MAY 25, 1915.
1,166,274.
Patented Dec. 28, 1915.
2 SHEETS—SHEET 1.
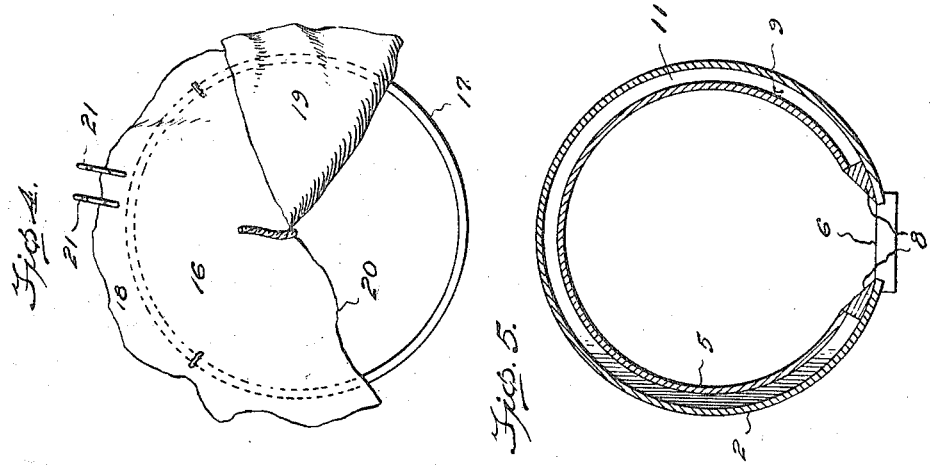
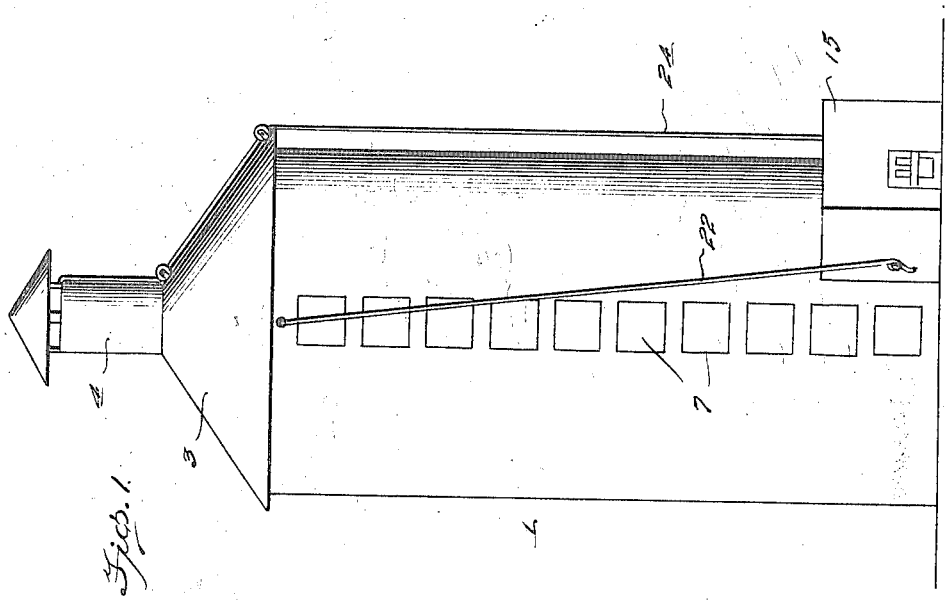
Witnesses
Inventors
H. E. Stoik
J. E. Fish

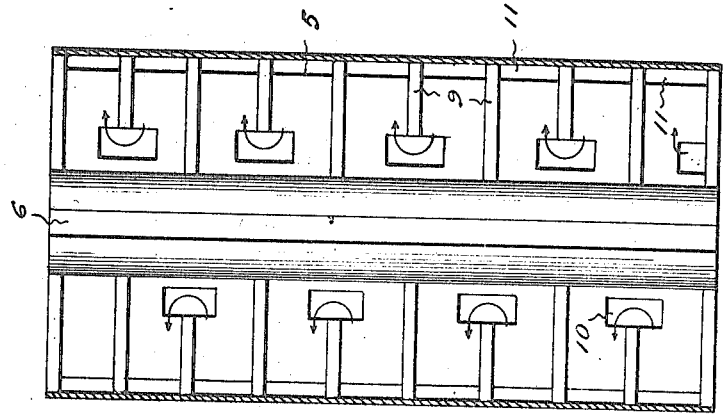
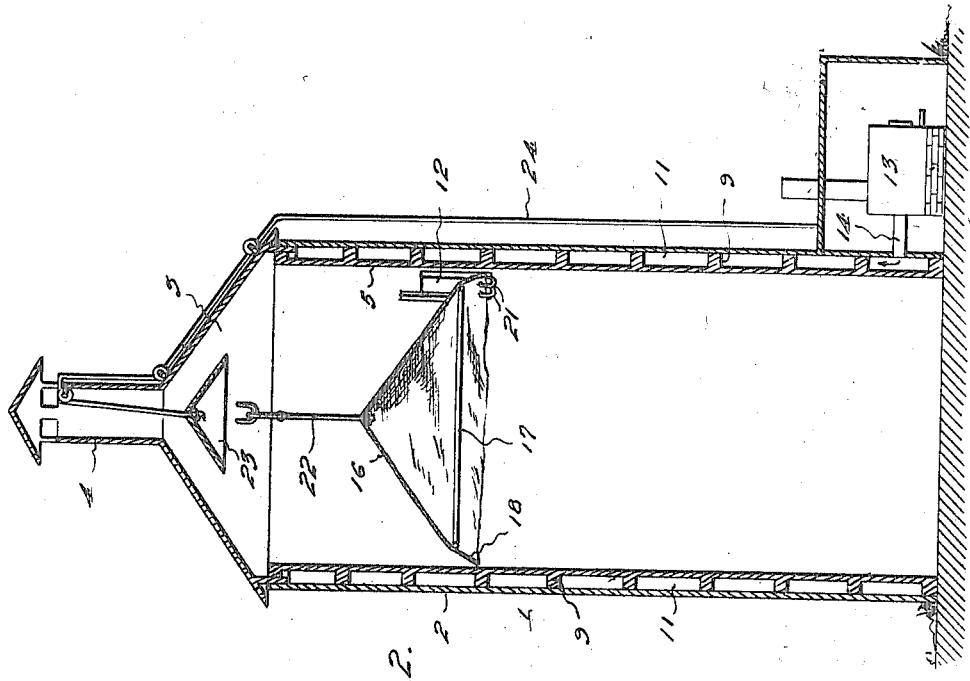

UNITED STATES PATENT OFFICE.

HENRY E. STOIK AND JESSE E. FISH, OF RICE LAKE, WISCONSIN.

SILO-HEATING SYSTEM.

1,166,274.  Specification of Letters Patent.  Patented Dec. 28, 1915.

Application filed May 25, 1915. Serial No. 30,428.

*To all whom it may concern:*

Be it known that we, HENRY E. STOIK and JESSE E. FISH, citizens of the United States, residing at Rice Lake, in the county of Barron and State of Wisconsin, have invented certain new and useful Improvements in Silo-Heating Systems; and we do hereby declare the following to be a full, clear, and exact description of the invention, such as will enable others skilled in the art to which it appertains to make and use the same.

This invention is an improved silo heating system for use in connection with any ordinary silo and which may be installed in a silo or constructed therewith while the silo is being built, the object of the invention being to provide means of improved construction whereby a silo may be readily heated during extremely cold weather or at any time desired and by means of which the heat is confined to and especially concentrated on the top of the ensilage in the silo where it is needed to enable the ensilage to be readily handled and to keep it from freezing.

The invention consists in the construction, combination and arrangement of devices hereinafter described and claimed.

In the accompanying drawings:—Figure 1 is a front elevation of a silo of usual form provided with a heating system in accordance with our invention. Fig. 2 is a vertical sectional view of the same. Fig. 3 is an elevation of the inner wall, the baffle ribs and the door jambs and showing the same arranged in the silo, the wall of the silo being indicated in section. Fig. 4 is a plan in detail of the canopy with the flap open. Fig. 5 is a horizontal sectional view of the silo and the inner wall.

The silo 1 may be of any suitable construction and may be made of any suitable material whether wood, concrete, or other suitable material and may be of any suitable form and is here shown as comprising a cylindrical wall 2 and a conical roof 3, the roof being shown as provided with a ventilating cupola 4.

In accordance with our invention we provide an inner wall 5 which is arranged within and in spaced relation to the outer wall 2. The inner wall extends from the bottom to the top of the silo and is provided with a vertical door opening 6 which is opposite the door openings 7 of the silo and the jambs 8 of said door 6 extend from the inner wall to and are closely connected with the outer walls and are substantially V-shaped in cross section as shown in Fig. 5.

The inner wall is provided on the side opposed to the wall 2, with a series of suitably spaced horizontally arranged baffle ribs 9 which extend around the same. Each baffle rib has one end in contact with one of the jambs and the other end spaced from the opposite jamb and opposite a door opening 10 in the inner wall and said door openings are alternately arranged on opposite sides of the door 6 as shown in Fig. 3 so that passages 11 are formed between the baffle ribs and around the inner wall and between the latter and the outer wall, each passage communicating at the point 10 with the passage next above and owing to the alternate arrangement of the door openings 10 have shortened ends of the baffle ribs, said passages form a continuous updraft which extends reversely around the inner wall between contiguous baffle ribs as will be understood and as indicated by the arrows in Figs. 3–5. Each opening 10 is provided with a removable door 12.

A suitable heater or furnace 13 is provided for heating air and supplying the heated air through a pipe 14 to the lower passage 11 which is here shown as located in a house 15 at one side of the silo. This heater may be installed in any suitable structure, a barn or other out house which is contiguous to the silo and the heater may be of any suitable construction. The heat can be taken from a barn by means of a pipe running from the barn floor through the heating room into the silo at the same place 14, where the heat passes from the stove, especially when the weather is not extremely cold.

In the silo is a canopy 16 which is here shown as conical in form and which in practice is preferably made of canvas and stretched around a hoop or ring 17 which is somewhat less than the inner diameter of the silo. The silo canopy is formed with an extended skirt or extension 18 below the ring and is also formed with a flap 19 which when turned back provides an opening 20 in the canopy as indicated in Fig. 4. The flap however is normally closed. The skirt or extension 18 of the canopy is provided with hooks 21 by means of which the same may be attached at one side to the upper side of any one of the door openings or frames 10 of the inner wall 5. The canopy is suspended from the roof of the silo by a rope 22 and may be lowered from time to time as the ensilage is used to arrange the canopy closely above the ensilage as indicated in Fig. 2 and the skirt 18 being attached to the upper side of the door opening or frame 10 immediately above the ensilage the heated air which passes upwardly and around the inner wall 5 and which enters the ensilage through said open door 10 is confined by the canopy immediately above the ensilage as will be understood, thus warming the top of the ensilage, keeping it from freezing and enabling the ensilage to be readily handled. Doors 12 will be placed in the openings 10 above the canopy so as to prevent the escape of heat into the upper part of the silo above the canopy without first passing under the canopy.

We also provide a conical regulating valve 23 which may be raised or lowered by a suitable top 24 and by means of which the lower end of the cupola 4 may be either entirely or partly closed as desired, thus regulating the escape of the heated air from the silo.

While we have herein shown and described a preferred form of our invention, we would have it understood that changes may be made in the form, proportion and construction of the several parts without departing from the spirit of the invention and within the scope of the appended claims.

Having thus described our invention, we claim:—

1. In a structure of the class described having an outer wall, an inner wall spaced from the outer wall and provided with circumferential baffle ribs extending therefrom to the outer wall and provided with non-alining openings and thereby forming tortuous passages between the walls and extending from the lower to the upper sides thereof said inner wall having openings communicating with said passage, doors or closures for said openings, means to supply heated air to the lowermost passage and a canopy arranged within the inner wall, adapted to be raised and lowered and provided with means whereby it may be attached at one side successively to the upper sides of said openings in the inner wall for the purpose set forth.

2. In a structure of the class described having an outer wall, an inner wall spaced from the outer wall and provided with circumferential baffle ribs extending therefrom to the outer wall and provided with non-alining openings and thereby forming tortuous passages between the walls and extending from the lower to the upper sides thereof said inner wall having openings communicating with said passage, doors or closures for said openings, means to supply heated air to the lowermost passage and a canopy arranged within the inner wall, adapted to be raised and lowered and provided with means whereby it may be attached at one side successively to the upper sides of said openings in the inner wall for the purpose set forth, the said structure having a ventilating cupola and being also provided with an adjustable valve to regulate the escape of heated air through said cupola.

In testimony whereof we affix our signatures in presence of two witnesses.

HENRY E. STOIK.
JESSE E. FISH.

Witnesses:
C. E. OVERBY,
P. PETERSON.